Feb. 5, 1963

C. T. BAIRD 3,076,664

MEAT HOOK RACK

Filed Dec. 29, 1961

INVENTOR.
CECIL T. BAIRD

BY *Kimmel & Crowell*
ATTORNEYS.

United States Patent Office
3,076,664
Patented Feb. 5, 1963

3,076,664
MEAT HOOK RACK
Cecil T. Baird, 1412 Dale St., Sioux City, Iowa
Filed Dec. 29, 1961, Ser. No. 163,308
1 Claim. (Cl. 280—47.19)

This invention relates to a meat hook rack and has as its primary object the provision of a portable receptacle adapted for the reception, storage and transport of meat hooks when the latter are not in use.

As conducive to a clearer understanding of this invention, it may here be pointed out that meat hooks, such as are customarily employed in supporting quarters of beef, or the like, from overhead racks during storage and transfer, are when not in use customarily thrown into a barrel or similar receptacle, or allowed to lie in corners of the storage space or the truck, or otherwise so placed at random as to be inaccessible when desired for reuse, and under extremely unsanitary conditions.

It is an important object of this invention, therefore, to provide a convenient portable rack for such meat hooks which may be transported from place to place so that the hooks may be suspended individually when not in use, in such position as to maintain relatively sanitary conditions, and at the same time be readily accessible for use when desired.

A further object of the invention is to provide a device of this character which may be readily adapted for either of the two types of meat hooks, the long and the short, customarily in use at the present time.

A further object of the invention is the provision of a device of this character which may be constructed in the size in accordance with the specific uses to which it is to be put.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing.

Similar reference characters refer to similar parts throughout the several views of the drawing.

Figure 1:
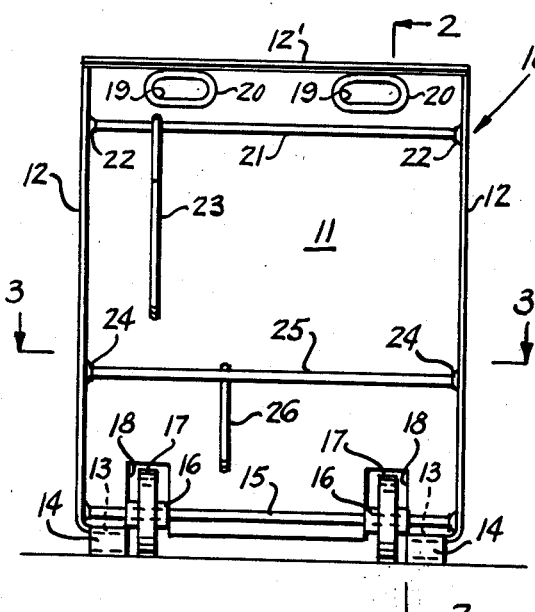
FIGURE 1 is a front elevational view of one form of meat hook rack constructed in accordance with the instant invention.
Figure 2:
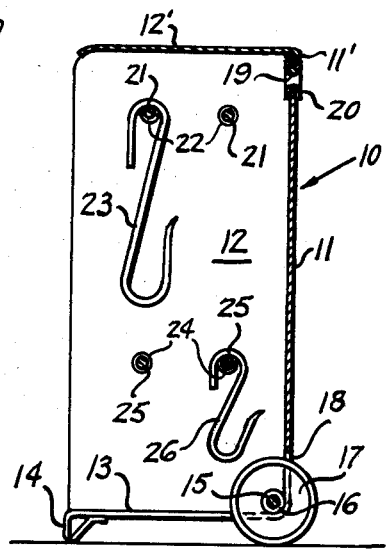
FIGURE 2 is a sectional view taken substantially along the line 2—2 of FIG. 1 as viewed in the direction indicated by the arrows.
Figure 3:
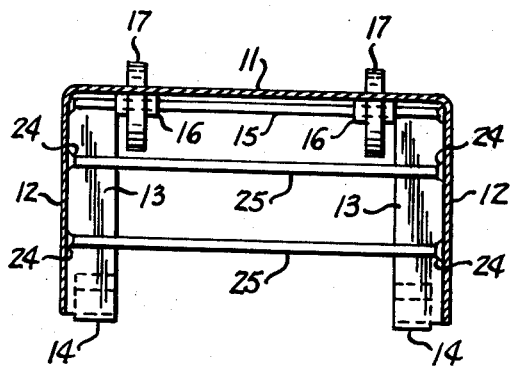
FIGURE 3 is a sectional view taken substantially along the line 3—3 of FIG. 1 as viewed in the direction indicated by the arrows.

Referring now to the drawings in detail, the device of the instant invention is generally indicated at 10, and comprises an upstanding rear wall 11 from which project forwardly extending side walls 12 of substantially equal height. While the device may be made of any desired size, it has been found preferable to make the back wall from 36 to 48 inches in width and from 4 to 4 feet 6 inches in height, to allow in each rack sufficient hanging space for approximately 100 long meat hooks and 100 short meat hooks, which are positioned therein in a manner to be more fully described hereinafter. The lower ends of walls 12 are inturned to provide horizontal flanges 13 at the bottom thereof, which are provided at their forward extremities with downwardly extending feet or projections 14 to insure proper leveling of the rack. Closely adjacent the juncture of rear wall 11 the ends of flanges 13 there is positioned a transversely extending axle 15 which has rotatably mounted thereon the hubs 16 of wheels 17, wheels 17 projecting rearwardly through slots 18 on the bottom of the rear wall 11.

Openings 19 are provided in rear wall 11 in spaced relation adjacent the top thereof and are provided with beads or flanges 20 surrounding the interior periphery thereof to form hand holds or hand grips.

Extending transversely between the side walls at a point adjacent the top thereof are a plurality, illustratively, two, transversely extending horizontal rods 21, which are welded as at 22 or otherwise suitably secured to the side walls 12 for the support of long meat hooks 23. A second set of lower bars 25 are welded to the side walls 12 as at 24 below the bars 21, and may be either aligned therewith, or offset therefrom as desired. Any suitable number of upper and lower bars 25 may be provided for any desired number of short meat hooks 26 as shown, in accordance with the dimensions of the rack. For example, a large rack might have three upper bars and three lower bars accommodating as many as 150 long hooks and 150 short hooks.

A lid or cover 12′, hinged as at 11′ to the top of rear wall 11, may be provided, if desired.

From the foregoing the use and operation of the device should now be readily apparent. When hooks 23 and 26 are not in use, they are suspended respectively from the upper bars 21 and the lower bars 25 for storage in a sanitary and readily accessible condition, the hooks being individually removed therefrom as required for use, and replaced on their respective bars when not in use. By virtue of the handles 19 and the wheels 17 it will be readily apparent that the device may be moved from place to place as desired so that meat hooks are always in a readily available position, or that conversely, the device is in a readily accessible position for placement of the hooks thereon after use.

From the foregoing it will now be seen that there is herein provided an improved meat hook rack which accomplishes all the objects of this invention, and others, including many advantages of great practical utility and commercial importance.

As many embodiments may be made of this inventive concept, and as many modifications may be made in the embodiment hereinbefore shown and described, it is to be understood that all other matter herein is to be interpreted merely as illustrative, and not in a limiting sense.

I claim:

A meat hook rack comprised of a substantially solid rear wall and a pair of substantially solid side walls extending forwardly therefrom and terminating in thin front edge portions, said rack having an open top, bottom, and front, and upper pair of horizontally aligned transverse bars extending between said side walls adapted for the suspension of long meat hooks thereon and a lower pair of horizontally aligned transverse bars extending between said side walls vertically aligned with said upper pair of bars, adapted for the suspension of short meat hooks thereon, a transverse axle extending between the lower rear corners of said side walls, wheels carried by said axle, horizontal flanges extending inwardly from the bottoms of said side walls, supporting and leveling feet carried by the front end of said flanges, said rear wall having lower spaced openings therein for the accommodation of said wheels, and upper spaced openings serving as hand holds.

References Cited in the file of this patent

UNITED STATES PATENTS

| | | |
|---|---|---|
| 790,669 | Winship | May 23, 1905 |
| 1,135,300 | Laurette | Apr. 13, 1915 |
| 2,463,391 | Kanaley | Mar. 1, 1949 |
| 2,990,190 | Eriksen | June 27, 1961 |

FOREIGN PATENTS

| | | |
|---|---|---|
| 247,961 | Switzerland | Jan. 3, 1948 |